(12) United States Patent
Lee

(10) Patent No.: US 10,301,747 B2
(45) Date of Patent: *May 28, 2019

(54) FIBER COMPRISING A MIXTURE OF POLY(M-PHENYLENE ISOPHTHALAMIDE) AND COPOLYMER MADE FROM 5(6)-AMINO-2-(P-AMINOPHENYL) BENZIMIDAZOLE

(71) Applicant: E I DU PONT DE NEMOURS AND COMPANY, Wilmington, DE (US)

(72) Inventor: Kiu-Seung Lee, Midlothian, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 825 days.

This patent is subject to a terminal disclaimer.

(21) Appl. No.: 14/526,635

(22) Filed: Oct. 29, 2014

(65) Prior Publication Data

US 2015/0113714 A1    Apr. 30, 2015

Related U.S. Application Data

(60) Provisional application No. 61/897,601, filed on Oct. 30, 2013.

(51) Int. Cl.
*D01F 8/04* (2006.01)
*D01F 8/12* (2006.01)
(Continued)

(52) U.S. Cl.
CPC ............ *D01F 8/12* (2013.01); *C08G 73/18* (2013.01); *C08L 79/08* (2013.01); *D01D 5/06* (2013.01);
(Continued)

(58) Field of Classification Search
CPC ... D01F 8/12; D01F 6/605; D01F 6/74; D01F 6/805; D01F 1/02; D01F 1/10;
(Continued)

(56) References Cited

U.S. PATENT DOCUMENTS 3,069,366 A    11/1962  DuPont
3,227,793 A    1/1966   Cipriani
(Continued)

FOREIGN PATENT DOCUMENTS

GB    1381181    1/1975
RU    2180369    3/2002
(Continued)

OTHER PUBLICATIONS

"Extrusion." Complete Textile Glossary. New York, NY: Celanese Acetate, 2001. N. pag. Print.*

*Primary Examiner* — Marla D McConnell
*Assistant Examiner* — Larissa E Rowe

(57) ABSTRACT

The invention concerns fiber, and a process for making same, the fiber comprising a mixture of at least a first polymer and a second polymer,
the first polymer having a structure derived from the reaction of one or more amine monomers and a plurality of acid monomers, wherein the one or more amine monomers includes at least 60 mole percent 5(6)-amino-2-(p-aminophenyl)benzimidazole, and the plurality of acid monomers include those having a structure of Cl—CO—Ar$_1$—CO—Cl and Cl—CO—Ar$_2$—CO—Cl wherein Ar$_1$ is an aromatic group having para-oriented linkages and Ar$_2$ is an aromatic group having meta-oriented linkages, and wherein the plurality of acid monomers has at least 50 mole percent of the monomer containing aromatic group Ar$_2$; and
the second polymer has a structure derived from the reaction of metaphenylene diamine and isophthaloyl chloride. This fiber has use in heat-resistant protective apparel fabrics and garments.

10 Claims, 1 Drawing Sheet

(51) Int. Cl.
*D01D 5/06* (2006.01)
*D01F 6/60* (2006.01)
*D01F 6/74* (2006.01)
*D01F 6/80* (2006.01)
*D01F 6/90* (2006.01)
*C08G 73/18* (2006.01)
*C08L 79/08* (2006.01)

(52) U.S. Cl.
CPC ............... *D01F 6/905* (2013.01); *D01F 8/04* (2013.01); *D01F 6/605* (2013.01); *D01F 6/74* (2013.01); *D01F 6/805* (2013.01); *D10B 2331/02* (2013.01); *Y10T 428/249921* (2015.04); *Y10T 428/2904* (2015.01)

(58) Field of Classification Search
CPC ........... D01F 6/60–605; D01F 6/78–82; D01F 6/88–905; D01F 8/04; D10B 2331/02–021; D10B 2331/14; C08G 73/18; D02G 3/443; C08L 2201/02; C08L 79/04; C08L 77/06; C08L 2203/12; C08L 77/10; C08L 79/08; D06P 1/39; D06P 3/001; D06P 3/04; D06P 3/06; A62B 17/003; D01D 1/02; D01D 1/065; D01D 5/06; D01D 5/30–36; D01D 5/0046; Y10T 428/2929–2931; Y10T 428/2973; D06M 15/61; D06M 15/653; D03D 15/0027; D04H 1/4382; D04H 1/541; D04H 1/65; D04H 3/147
USPC ................................ 428/370, 373–396, 397; 264/171.1–171.13, 171.23, 172.11–172.18
See application file for complete search history.

(56) References Cited

U.S. PATENT DOCUMENTS

| | | | |
|---|---|---|---|
| 3,287,324 A | 11/1966 | Sweeny | |
| 3,354,127 A * | 11/1967 | Hill, Jr. | ................ C08G 69/32 524/233 |
| 3,414,645 A | 12/1968 | Morgan | |
| 3,511,819 A | 5/1970 | DuPont | |
| 3,767,756 A | 10/1973 | DuPont | |
| 3,839,140 A * | 10/1974 | Tyler | ........................ C08K 5/03 260/DIG. 24 |
| 3,869,429 A | 3/1975 | Blades | |
| 3,869,430 A | 3/1975 | DuPont | |
| 4,278,779 A * | 7/1981 | Nakagawa | ............. C08G 69/32 264/331.19 |
| 4,309,476 A * | 1/1982 | Nakamura | ............. D01F 6/605 264/184 |
| 4,668,234 A | 5/1987 | DuPont | |
| 4,755,335 A | 7/1988 | DuPont | |
| 4,883,496 A | 11/1989 | DuPont | |
| 5,096,459 A | 3/1992 | Ghorashi | |
| 5,667,743 A | 9/1997 | DuPont | |
| 5,807,490 A | 9/1998 | Davis | ..................... B29B 13/022 210/739 |
| 6,569,366 B1 * | 5/2003 | Toyohara | ................ D01F 6/605 264/178 F |
| 2010/0029159 A1 * | 2/2010 | Ishihara | ................ C08G 69/32 442/301 |
| 2010/0291384 A1 * | 11/2010 | Gabriele | ................ D01D 4/06 428/375 |

FOREIGN PATENT DOCUMENTS

| | | |
|---|---|---|
| RU | 2345988 | 2/2009 |
| WO | WO0077283 | 12/2000 |

* cited by examiner

FIBER COMPRISING A MIXTURE OF POLY(M-PHENYLENE ISOPHTHALAMIDE) AND COPOLYMER MADE FROM 5(6)-AMINO-2-(P-AMINOPHENYL) BENZIMIDAZOLE

BACKGROUND OF THE INVENTION

Field of the Invention

The invention concerns shaped articles such as fibers, obtainable from a composite polymer solution comprising a mixture of at least two polymers, wherein at least one polymer comprises poly(meta-phenylene isophthalamide) (MPD-I) and the other polymer is a copolymer made from the diamine monomer 5(6)-amino-2-(p-aminophenyl)benzimidazole (DAPBI), and methods of making the same. These fibers have demonstrated properties associated with DAPBI-based polymers, such as acid dyeability. One use for this fiber is in heat-resistant applications; such applications include protective apparel fabrics and garments.

While aramid fiber made from homopolymer solutions of MPD-I has been commercially sold under the name of Nomex® (by E. I. du Pont de Nemours and Company), TeijinConex® (by Teijin Ltd.), and under other names, those that wanted to dye this aramid fiber for use in colored fabrics were generally restricted to processes that used basic dyes to color the fiber, because it is difficult to dye MPD-I with acidic dyes. However, in some applications, it could be desirable to provide color to an aramid fiber using acidic dyes.

It has been found that by spinning and coagulating a composite polymer solution containing a homogeneous mixture of MPD-I with a copolymer having charge characteristics opposite to MPD-I, made from the monomer (DAPBI), a shaped article, like a fiber, can be made that only accepts acid dyes. This characteristic is due to a surprising sheath-core-like structure formed from that homogeneous composite polymer solution during coagulation of the dope filaments.

Further, it is believed the faster coagulating MPD-I homopolymer forces the slower coagulating DAPBI-based copolymer to migrate to the surface of the shaped article during the shaping process. The shaped articles are believed to present the improved properties of the more expensive DAPBI copolymer while containing a significant amount of the less expensive MPD-I homopolymer. Specifically, the shaped articles have a dielectric strength similar to articles made solely with the DAPBI copolymer, which has a higher dielectric strength than MPD-I homopolymer. The shaped articles also have improved thermal stability reflective of the limiting oxygen index (L.O.I.) of 45 for DAPBI, versus the lower L.O.I. of about 30 for MPD-I.

SUMMARY OF THE INVENTION

This invention relates to a fiber comprising a mixture of at least a first polymer and a second polymer; the first polymer having a structure derived from the reaction of one or more amine monomers and a plurality of acid monomers, wherein
  i) the one or more amine monomers includes at least 60 mole percent 5(6)-amino-2-(p-aminophenyl)benzimidazole, based on the total amount of amine monomers; and
  ii) the plurality of acid monomers include those having a structure of

wherein $Ar_1$ is an aromatic group having para-oriented linkages and Ar2 is an aromatic group having meta-oriented linkages, and wherein the plurality of acid monomers has at least 50 mole percent of the monomer containing aromatic group $Ar_2$; and the second polymer has a structure derived from the reaction of metaphenylene diamine and isophthaloyl chloride.

This invention also relates to a method of producing a fiber comprising:
  a) mixing or blending at least a first polymer and a second polymer; the first polymer having a structure derived from the reaction of one or more amine monomers and a plurality of acid monomers, wherein
    i) the one or more amine monomers includes at least 60 mole percent 5(6)-amino-2-(p-aminophenyl)benzimidazole, based on the total amount of amine monomers; and
    ii) the plurality of acid monomers include those having a structure of

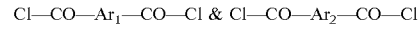

wherein $Ar_1$ is an aromatic group having para-oriented linkages and $Ar_2$ is an aromatic group having meta-oriented linkages, and
  wherein the plurality of acid monomers has at least 50 mole percent of the monomer containing aromatic group $Ar_2$; and
the second polymer has a structure derived from the reaction of metaphenylene diamine and isophthaloyl chloride;
  b) providing a homogeneous solution of the at least first polymer and a second polymer the suitable for spinning fibers; and
  c) spinning fibers from the solution.

DETAILED DESCRIPTION

Figure 1:
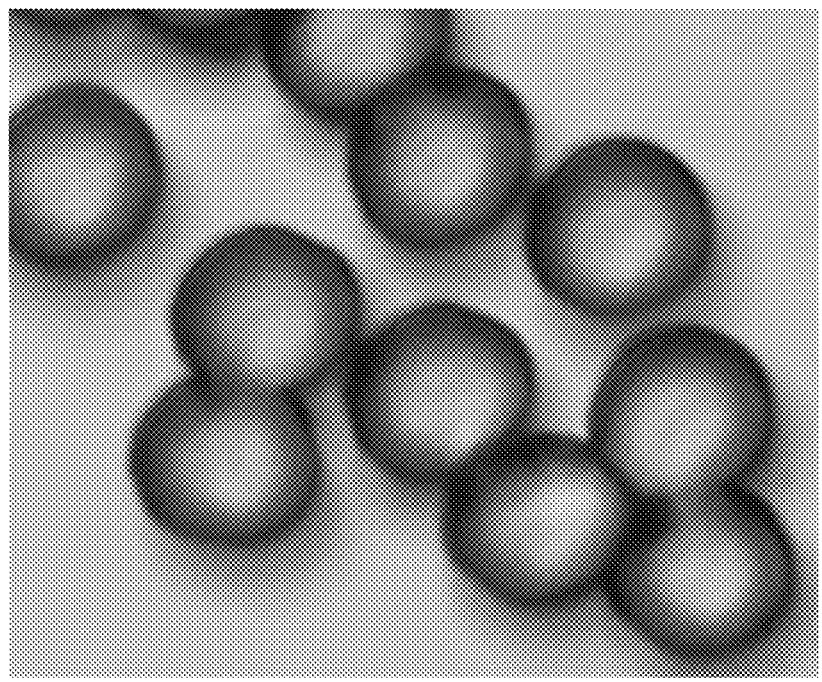
FIG. 1 is a photographic representation of dyed filament cross-section having a composition, by weight, of 50% first polymer and 50% second polymer, as spun through standard round spinneret holes.

The invention concerns a fiber comprising a mixture of at least a first polymer and a second polymer. The first polymer preferably is dyeable with acid dyes while the second polymer preferably is dyeable with basic dyes.

The first polymer has a structure derived from the reaction of one or more amine monomers and a plurality of acid monomers, wherein the one or more amine monomers includes at least 60 mole percent 5(6)-amino-2-(p-aminophenyl)benzimidazole (DAPBI), based on the total amount of amine monomers. One preferred first polymer is made substantially from 60 to 80 mole percent DAPBI diamine monomer. In some other embodiments, the one or more amine monomers is 100 mole percent 5(6)-amino-2-(p-aminophenyl)benzimidazole (DAPBI). In some embodiments, the one or more amine monomers include metaphenylene diamine (MPD) in addition to the DAPBI. In some embodiments, the DAPBI is combined with 20 to 40 mole percent MPD amine monomer, with 60/40 DAPBI/MPD being a most preferred combination.

The one or more amine monomers are copolymerized with a plurality of acid monomers in a compatible solvent to create a copolymer. The plurality of acid monomers includes those having a structure of

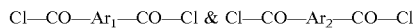

Cl—CO—Ar$_1$—CO—Cl & Cl—CO—Ar$_2$—CO—Cl wherein Ar$_1$ is an aromatic group having para-oriented linkages and Ar$_2$ is an aromatic group having meta-oriented linkages. The plurality of acid monomers has at least 50 mole percent of the monomer containing aromatic group Ar$_2$.

Ar$_1$ and Ar$_2$ can be any unsubstituted or substituted aromatic ring structures but are preferably benzene groups. A preferred acid monomer containing aromatic group Ar$_2$ is isophthaloyl dichloride and a preferred aromatic group containing Ar$_1$ is terephthaloyl dichloride. In some embodiments, the plurality of acid monomers has 60 to 80 mole percent of the monomer containing aromatic group Ar$_2$ having meta-oriented linkages and 20 to 40 mole percent of the monomer containing the aromatic group Ar$_1$ having para-oriented linkages.

Useful general techniques for making the monomer 5(6)-amino-2-(p-aminophenyl)benzimidazole (DAPBI) and the first polymer include those disclosed in, for example, Russian Federation Pat. Nos. 2,345,988 to Vulakh et al. and 2,180,369 to Machalaba et al.; Great British Pat. No. 1,381,181 to Kudryavtsev et al.; and U.S. Pat. No. 3,511,819 to Bleasdale and U.S. Pat. No. 3,354,127 to Hill et al.

In some embodiments, the first polymer can be dyed with one or more acidic dyes; that is, the polymer accepts and can be colored by a dye having a negative-charge-seeking positive (or electron-deficient) center.

The second polymer has a structure derived from the reaction of metaphenylene diamine and isophthaloyl chloride. The preferred second polymer is poly (metaphenylene isophthamide) in the form of a polyamide homopolymer. As an aramid, it has at least 85% of the amide (—CONH—) linkages attached directly to two aromatic rings. The rings can be unsubstituted or substituted. The preferred second polymer is a meta-aramid, wherein the two rings or radicals are meta-oriented with respect to each other along the molecular chain. Preferably, the second polymer derived from the reaction of metaphenylene diamine and isophthaloyl chloride has no more than 10 percent of other diamines substituted for a primary metaphenylene diamine used in forming the polymer or no more than 10 percent of other diacid chlorides substituted for a primary isophthaloyl chloride used in forming the polymer.

Useful general techniques for making the second polymer, and specifically poly(meta-phenylene isophthalamide) (MPD-I), include those disclosed in, for example, U.S. Pat. Nos. 3,063,966; 3,227,793; 3,287,324; 3,414,645; and 5,667,743.

In some embodiments, the second polymer can be dyed with one or more basic dyes; that is, the polymer accepts and can be colored by a dye having a positive-charge-seeking negative (or electron-rich) center.

The homogeneous mixture of at least a first polymer and a second polymer used to make the fiber preferably contains 25 to 80 weight percent of the first polymer, based on the total amount of first polymer and second polymer. When the fiber contains only the first polymer and the second polymer, the fiber preferably contains 25 to 80 weight percent of the first polymer and 20 to 75 weight percent of the second polymer.

In some embodiments, the homogeneous mixture of at least a first polymer and a second polymer used to make the fiber preferably contains 25 to 50 weight percent of the first polymer, based on the total amount of first polymer and second polymer.

While other polymers or copolymers can be mixed in with the mixture of the first and second polymers, in a preferred embodiment the mixture contains only the first copolymer combined with the second homopolymer.

The at least a first polymer and second polymer can preferably be independently made via polycondensation of one or more types of diamine monomer with one or more types of chloride monomers in a dialkyl amide solvent such as N-methyl pyrrolidone, dimethyl acetamide, or mixtures thereof. In some embodiments of the polymerizations of this type an inorganic salt such as lithium chloride or calcium chloride is also present. If desired the polymer can be isolated by precipitation with non-solvent such as water, neutralized, washed, and dried. The polymer can also be made via interfacial polymerization that produces polymer powder directly that can then be dissolved in a solvent for fiber production.

Fiber is spun from a homogeneous mixture of at least a first polymer and second polymer in a solution. A solution suitable for spinning fibers containing the homogeneous mixture can be achieved by a number of ways. These include polymerizing the first polymer in a solvent and isolating that first polymer as a solid, and then polymerizing separately the second polymer in a solvent and isolating that second polymer as a solid. The two solids are then mixed to form a mixture of solids and dissolved in a suitable solvent in amount that forms a homogeneous solution of the polymers suitable for spinning fibers. Alternatively, the first polymer can be polymerized in a solvent to form a first polymer solution and the second polymer can be polymerized in a solvent to form a second polymer solution. The two solutions can then be mixed to form a homogeneous solution of polymers suitable for spinning fibers. Other combinations of these methods are possible, as is other possible methods of forming a solution that is suitable for spinning fibers that contains a homogeneous mixture of at least the first polymer and second polymer.

Fiber spinning can be accomplished through a multi-hole spinneret by wet spinning, dry spinning, or dry-jet wet spinning (also known as air-gap spinning) to create a multi-filament yarn or tow as is known in the art. The fibers in the multi-filament yarn or tow after spinning can then be treated to neutralize, wash, dry, or heat treat the fibers as needed using conventional techniques to make stable and useful fibers. Exemplary dry, wet, and dry-jet wet spinning processes are disclosed U.S. Pat. Nos. 3,063,966; 3,227,793; 3,287,324; 3,414,645; 3,869,430; 3,869,429; 3,767,756; and 5,667,743.

It has been found that when the homogeneous solution of the mixture of polymers described herein is spun through a spinneret having regular holes or capillaries comprised of single holes, the filaments that are formed have a surprising sheath-core-like structure. Surprisingly, this structure is believed to be formed during coagulation of the dope filaments and does not require special sheath-core designed spinneret holes or capillaries. In other words, the inventor has found that the fiber, when spun from a single homogeneous solution containing a mixture of polymers, has differing amounts of those polymers distributed radially in that fiber.

For purposes herein, the term "fiber" is defined as a relatively flexible, macroscopically homogeneous body having a high ratio of length to the width of the cross-sectional area perpendicular to that length. The fiber cross section can be any shape, but is typically round. Preferably the fibers are generally solid without macroscopic voids or holes or annular open regions. Herein, the term "filament" or "continuous filament" is used interchangeably with the term "fiber."

Figure 2:
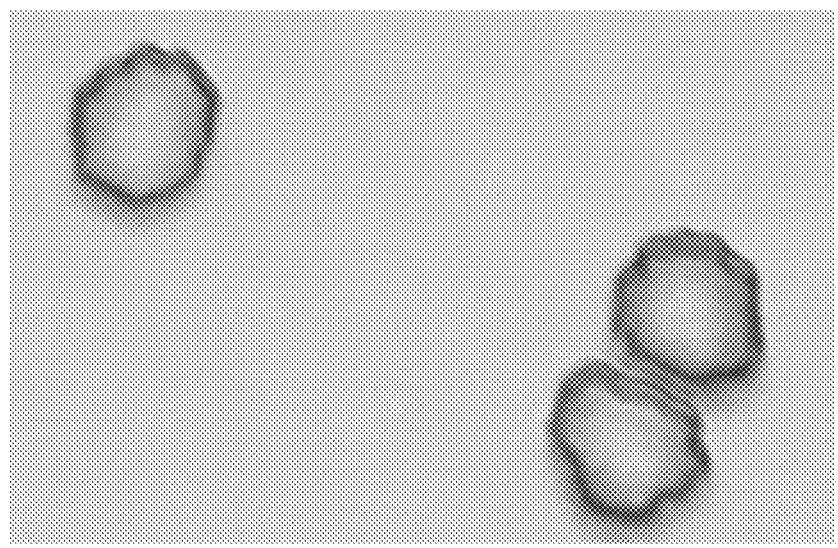
FIG. 2 is a photographic representation of dyed filament cross-section having a composition, by weight, of 35% first polymer and 65% second polymer, as spun through standard round spinneret holes.

A cross-section of the coagulated fiber reveals the fiber has a first polymer-rich zone for the sheath, a second polymer-rich zone for the core, and a transition zone having a combination of the first and second polymers. The thickness of the first polymer-rich zone sheath and the second polymer-rich zone is determined by the relative amounts of first polymer and the second polymer in the homogeneous solution. The surprising sheath-core structure is illustrated in FIG. 1 and FIG. 2. FIG. 1 is a photographic representation of coagulated filaments made from a homogeneous mixture of 50 weight percent MPD-I polymer and 50 weight percent DABPI-I/T (60/40 mole %) copolymer that has in turn been dyed with acidic dye. The figures reveal the resulting fiber has three zones. The first is a MPD-I rich zone at the center or core of the filaments that is uncolored or undyed by the acidic dye. The second is a DAPBI-I/T rich zone that forms the outer sheath and that is significantly dyed a dark shade, representative of the ability to color or dye that copolymer with acid dyes. Between the uncolored core and the colored sheath is a partially colored or dyed transition zone that contains a mixture of the two polymers. It is believed the figures confirm there is a gradient between the MPD-I rich core to the DAPBI-I/T rich sheath, with the transition zone having a mixture of DAPBI-I/T & MPD-I, wherein in the transition zone the mixture has a higher weight percentage of the MPD-I polymer nearer the core and a higher weight percentage of the DAPBI-/I/T copolymer nearer the sheath. FIG. 2 is a photographic representation of cross-sections similarly dyed filaments made from same first and second polymers; however these polymers are made from a mixture of 65 weight percentage MPD-I and 35 weight percentage DAPBI-I/T (60/40 mole %). The resultant fibers have a larger core zone and a smaller sheath zone due to the relative increase in the amount of core polymer versus the sheath polymer.

Although not to be bound by theory, it is believed this surprising sheath-core structure is the result of differing rates of solvent removal from the individual polymers in the mixture during coagulation and/or quenching. Coagulation rate of the MPD-I polymer is believed to be significantly higher than the coagulation rate of either the DAPBI-I/T copolymer or DAPBI/MPD-I/T copolymer, meaning the core material (MPD-I) coagulates first, pushing the slower coagulating copolymer (DAPBI-I/T or DAPBI/MPD-I/T) to the filament surface. It is believed the preferred process is to conduct this multi-stage coagulation using wet spinning, where the combination of preferred coagulant (water) and residence time in the coagulation bath is sufficient to allow the slower coagulating and more mobile copolymer to be forced to the surface of the filament during coagulation. However, it is believed that any fiber spinning arrangement could be used, assuming a suitable coagulation system, involving a suitable coagulant and suitable residence time was used.

The filaments can be collected as continuous filament fibers and multifilament yarns of continuous filaments by processes well known to those skilled in the art. For example, multifilament continuous filament yarns can be made by winding filament thread lines directly on a bobbin, with or without twist; or if needed, combining multiple filament thread lines to form higher denier yarns.

Alternatively, filaments can be converted into staple fibers. As used herein, the term "staple fibers" refers to fibers that are cut to a desired length or are stretch broken, having a low ratio of length to the width of the cross-sectional area (perpendicular to that length), when compared with filaments. Man-made staple fibers are cut or made to a length suitable for processing on cotton, woolen, or worsted yarn spinning equipment. The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a length, or an average length, of about 0.25 centimeters (0.1 inches) to about 30 centimeters (12 inches). In some embodiments, the length of a staple fiber is from about 1 cm (0.39 in) to about 20 cm (8 in). In some preferred embodiments the staple fibers made by short staple processes have a staple fiber length of about 1 cm (0.39 in) to about 6 cm (2.4 in).

Continuous filament can be converted into staple fibers by any number of ways known in the art, including processes that creel a number of bobbins of continuous filaments and concurrently cut the filaments to form cut staple fibers. For example, the staple fibers can be cut from continuous straight fibers using a rotary cutter or a guillotine cutter resulting in straight (i.e., non-crimped) staple fiber, or additionally cut from crimped continuous fibers having a saw tooth shaped crimp along the length of the staple fiber, with a crimp (or repeating bend) frequency of preferably no more than 8 crimps per centimeter.

The staple fibers can also be formed by stretch breaking continuous fibers resulting in staple fibers with deformed sections that act as crimps. Stretch broken staple fibers can be made by breaking a tow or a bundle of continuous filaments during a stretch break operation having one or more break zones that are a prescribed distance creating a random variable mass of fibers having an average cut length controlled by break zone adjustment.

Generally these staple fibers are packaged as bales for storage and shipping; the staple fibers are then formed into spun staple yarns by processes that involve first opening the bales of staple fibers and then further processing the clumps of staple fibers in openers, blenders, and/or cards to form slivers of staple fibers. Generally, in the individual staple fibers are opened or separated to a degree that is normal in fiber processing to make a useful fabric, such that fiber knots or slubs and other major defects due to poor opening of the staple fibers are not present in an amount that detract from the final fabric quality. A carding machine is commonly used to separate, align, and deliver fibers into a continuous strand of loosely assembled fibers without substantial twist, commonly known as carded sliver. The carded sliver is processed into drawn sliver, typically by, but not limited to, a two-step drawing process.

Spun staple yarns are then formed from the drawn sliver using conventional techniques. These techniques include conventional cotton system, short-staple spinning processes, such as, for example, open-end spinning, ring-spinning, or higher speed air spinning techniques such as Murata air-jet spinning where air is used to twist the staple fibers into a yarn. The formation of spun yarns useful in fabrics can also be achieved by use of conventional woolen processes, long-staple or stretch-break spinning processes, such as, for example, worsted or semi-worsted ring-spinning.

Regardless of the processing system, ring-spinning is the generally preferred method for making the spun staple yarns using traditional long and short staple ring spinning processes that are well known in the art. For short staple, cotton system spinning fiber lengths from about 1.9 to 5.7 cm (0.75 in to 2.25 in) are typically used. For long staple, worsted or woolen system spinning, fibers up to about 16.5 cm (6.5 in) are typically used.

Spun staple yarns can also be made directly by stretch breaking using stretch-broken tow-to-top staple processes. The staple fibers in the yarns formed by traditional stretch break processes typically have length of up to about 18 cm (7 in) long. However spun staple yarns made by stretch breaking can also have staple fibers having maximum lengths of up to around 50 cm (20 in.) through processes as described for example in PCT Patent Application No. WO 0077283. Stretch broken staple fibers normally do not require crimp because the stretch-breaking process imparts a degree of crimp into the fiber.

Fabrics can be made from the fibers, or from spun staple yarns or multifilament continuous yarns comprising the fibers, and such fabrics can include but are not limited to woven or knitted fabrics. Such fabrics are well known to those skilled in the art. By "woven" fabric is meant a fabric usually formed on a loom by interlacing warp or lengthwise yarns and filling or crosswise yarns with each other to generate any fabric weave, such as plain weave, crowfoot weave, basket weave, satin weave, twill weave, and the like. Plain and twill weaves are believed to be the most common weaves used in the trade and are preferred in many embodiments.

By "knitted" fabric is meant a fabric usually formed by interlooping yarn loops by the use of needles. In many instances, to make a knitted fabric spun staple yarn is fed to a knitting machine which converts the yarn to fabric. If desired, multiple ends or yarns can be supplied to the knitting machine either plied of unplied; that is, a bundle of yarns or a bundle of plied yarns can be co-fed to the knitting machine and knitted into a fabric, or directly into a article of apparel such as a glove, using conventional techniques. In some embodiments it is desirable to add functionality to the knitted fabric by co-feeding one or more other staple or continuous filament yarns with one or more spun staple yarns having the intimate blend of fibers. The tightness of the knit can be adjusted to meet any specific need. A very effective combination of properties for protective apparel has been found in for example, single jersey knit and terry knit patterns.

In some particularly useful embodiments, the fibers and yarns containing the fibers can be used to make flame-resistant garments. In some embodiments the garments can have essentially one layer of the protective fabric made from the spun staple yarn. Exemplary garments of this type include jumpsuits and coveralls for fire fighters or for military personnel. Such suits are typically used over the firefighters clothing and can be used to parachute into an area to fight a forest fire. Other garments can include pants, shirts, gloves, sleeves and the like that can be worn in situations such as chemical processing industries or industrial electrical/utility where an extreme thermal event might occur. In some preferred embodiments the fabrics have an arc resistance of at least 0.8 calories per square centimeter per ounce per square yard.

In other embodiments the fibers and yarns containing the fibers can be used in any layer of multilayer flame-resistant garments having a general construction such as disclosed in U.S. Pat. No. 5,468,537. One such garment has three layers or three types of fabric constructions, each layer or fabric construction performing a distinct function. There is an outer shell fabric that provides flame protection and serves as a primary defense from flames for the fire fighter. Adjacent the outer shell is a moisture barrier that is typically a liquid barrier but can be selected such that it allows moisture vapor to past through the barrier. Laminates of Gore-Tex® PTFE membrane or Neoprene® membranes on a fibrous nonwoven or woven meta-aramid scrim fabric are moisture barriers typically used in such constructions. Adjacent the moisture barrier is a thermal liner, which generally includes a batt of heat resistant fiber attached to an internal face cloth. The moisture barrier keeps the thermal liner dry and thermal liner protects the wearer from heat stress from the fire or heat threat being addressed by the wearer.

The fiber, or yarns of the fiber, can be colored using such methods as those disclosed in, for example, U.S. Pat. Nos. 4,668,234; 4,755,335; 4,883,496; and 5,096,459. The fiber can be colored prior to being used in a fabric. Alternatively, the fiber or yarn can be made into a fabric, and this fabric can then be dyed and made into garments. Alternatively, the fabric can be made into garments and the garments piece-dyed. A dye assist agent, also known as a dye carrier, may be used to help increase dye pick up of the fibers. By dyeing the fibers, fabrics, or garments with the use of a dye carrier the crystallinity of the fibers may be increased. Useful dye carriers include aryl ether, benzyl alcohol, or acetophenone.

Test Methods

Fiber Dyeing Procedure Make up the dye module with 300 ml of de-ionized water, 50 ml of benzyl alcohol (carrier) and 0.2180 grams of fiber sample and close the cap tight. Place the dye module in heating chamber of the dyeing machine Ahiba Polymat by Data Color Type PM 80086. Set the temperature at 70° C., and run for 10 minutes. Take out the dye module from the machine, and add 2 weight percent dye, based on the weight of the fiber, and dissolve in the solution.

Place the dye module back in the dyeing machine and set the temperature at 130° C. and run for one hour. Cool the dye bath to room temperature and open the machine. Remove the module from the machine and open. Take out the fiber and rinse with de-ionized water several times. Scour the fiber with detergent thoroughly and squeeze out the excess water. Dry the fiber in an oven at 120° C. overnight.

EXAMPLES

The invention is illustrated by, but is not intended to be limited by the following examples. Unless otherwise stated, the relative amount of polymer and copolymer provided in a mixture is represented in weight percent, based on the total amount of the polymer and copolymer mixed together, and the relative amount of amine or acid monomers used in the copolymers is provided in mole percent based on the total amount of that type of monomer (amine or acid monomer) in the copolymer.

Example 1

Preparation of MPD-I Homopolymer

A polymer solution having a MPD-I polymer concentration of 19.3% by weight was made in the following manner. 214.2 grams of DMAc and 18.168 grams (0.168 moles) of 1,3-phenylenediamine (MPD) were added to a 1-liter reaction kettle, equipped with a basket stirrer and a nitrogen inlet/outlet. The contents were stirred under a nitrogen blanket at room temperature until solid particles of MPD were completely dissolved. The kettle was then placed in an ice-water bath and while stirring, the contents were cooled to ~10° C. The kettle was removed from the ice-water bath. 38.098 grams (0.168 moles) of isophthaloyl dichloride (ICl) was added to the reaction mixture in the kettle all at once. The solution slowly became viscous and thicker with time. When the solution viscosity reached the plateau (after one hour or so), 12.447 grams (0.168 moles) of calcium hydroxide ($Ca(OH)_2$) that had been slurried with an equal amount of DMAc, was added to the solution and then stirred vigorously until all solid particles of $Ca(OH)_2$ disappeared. Stirring was continued for an additional one hour to complete the neutralization. The reaction kettle was disassembled and placed in a vacuum oven and heated to 70° C. to evaporate additional DMAc and water until the total polymer solution weight was 207.2 grams.

Example 2

Preparation of DAPBI/MPD (80/20)-I/T (70/30) Copolymer 211.0 grams of DMAc and 8.427 grams of $CaCl_2$ were added to a 1 liter reaction kettle, equipped with a basket stirrer and a nitrogen inlet/outlet, and then heated to 70° C. to completely dissolve the $CaCl_2$. 13.364 grams (0.060 moles) of DAPBI [2-(p-aminophenyl)-5-aminobenzimidazole] was added to the hot solution and stirred until DAPBI was completely dissolved. The solution was then cooled to room temperature (25° C.) with stirring. 10.889 grams (0.054 moles) of ICl (isophthaloyl chloride) was then added, all at once, and stirred for 30 minutes. 1.765 grams (0.016 moles) of MPD (m-phenylene diamine) was then added and stirred until all MPD was dissolved. Then, 4.562 grams (0.022 moles) of TCl (terephthaloyl chloride) was added all at once and stirred for 60 minutes. The solution got more and more viscose with time, and the solution temperature rose to 55° C., and further increase was controlled by slowing down the stirrer. The resultant polymer concentration in the solution was 10% (w/w) and the $CaCl_2$/amine molar ratio was 1.000. To determine inherent viscosity, a small portion of the solution was isolated in the water and washed several times and dried in a 120° C. vacuum oven. The inherent viscosity measured in sulfuric acid (0.5 g/1 dl) was 2.65 dl/g.

Example 3

Preparation of DAPBI-T/I (40/60) Copolymer 372.4 grams of DMAc and 14.10 grams of $CaCl_2$ were added to a 1 liter reaction kettle, equipped with a basket stirrer and a nitrogen inlet/outlet, and then heated to 70° C. to completely dissolve the $CaCl_2$. 15.825 grams (0.071 moles) of DAPBI was added to the hot solution and stirred until the DAPBI is dissolved. The solution was cooled to room temperature (25° C.) with stirring. Then 5.730 grams (0.028 moles) of TCl was added all at once and stirred for 30 minutes, followed by addition of 8.617 grams (0.042 moles) of ICl. The reaction mixture was then stirred for 60 minutes. The solution got more and more viscose with time, and the solution temperature rose to 55° C., and further increase was controlled by slowing down the stirrer. The resultant polymer concentration in the solution was 6% (w/w) and the $CaCl_2$/amine molar ratio was 1.800. To determine inherent viscosity, a small portion of the solution was isolated in the water and washed several times and then dried in a 120° C. vacuum oven. The inherent viscosity measured in sulfuric acid (0.5 g/1 dl) was 5.09 dl/g.

Example 4

Preparation of a 78/22 Weight Percent Polymer Mixture of DAPBI/MPD (80/20)-I/T (70/30) Copolymer and MPD-I Homopolymer 80 grams of the DAPBI/MPD (80/20)-I/T (70/30) copolymer solution (8 g of polymer) of Example 2 was added to a reaction kettle equipped with disc stirrer and nitrogen inlet/outlet. 150 grams of the MPD-I homopolymer solution (28.95 g of polymer) of Example 1 was added and stirred for one hour at high speed. The solution temperature was controlled below 55° C. The mixture solution was placed in vacuum oven at room temperature overnight to remove bubbles generated during the mixing. The resultant solution was transparent and clear showing that the blend was compatible and was capable of being spun into fibers.

Example 5

Preparation of a 20/80 Weight Percent Polymer Mixture of DAPBI-I/T (60/40) Copolymer and MPD-I Homopolymer 120 grams of the DAPBI-I/T (60/40) copolymer solution (7.24 g of polymer) of Example 3 was added to a reaction kettle equipped with disc stirrer and nitrogen inlet/outlet. 150 grams of the MPD-I homopolymer solution (28.95 g of polymer) of Example 1 was added and stirred for one hour at high speed. The solution temperature was controlled below 55° C. The mixture solution was placed in vacuum oven at room temperature overnight to remove bubbles generated during the mixing. The resultant solution was transparent and clear showing that the blend was compatible and was capable of being spun into fibers.

Example 6

Preparation of a 50/50 Weight Percent Polymer Mixture of DAPBI-I/T (60/40) Copolymer and MPD-I Homopolymer 475 grams of the DAPBI-I/T (60/40) copolymer solution (28.95 grams of polymer) of Example 3 was added to a reaction kettle equipped with disc stirrer and nitrogen inlet/outlet. 150 grams of the MPD-I solution (28.95 g of polymer) of Example 1 was added and stirred for one hour at high speed. The solution temperature was controlled below 55° C. The mixture solution was placed in vacuum oven at room temperature overnight to remove bubbles generated during the mixing. The resultant solution was transparent and clear showing that the blend was compatible and was capable of being spun into fibers.

Comparison Example A

Preparation of Incompatible 22/78 Weight Percent Polymer Mixture of DAPBI/MPD (50/50)-I/T (25/75) Copolymer and MPD-I Homopolymer A DAPBI/MPD (50/50)-I/T (25/75) copolymer was made as follows. 297.1 grams of DMAc and 11.242 grams of $CaCl_2$ were added to a 1 liter reaction kettle, equipped with a basket stirrer and a nitrogen inlet/outlet, and then heated to 70° C. to completely dissolve the $CaCl_2$. 7.571 grams (0.034 moles) of DAPBI was added to the hot solution and stirred until the DAPBI was completely dissolved. To this solution, 3.651 grams (0.034 moles) of MPD was added and dissolved. The solution was cooled to room temperature (25° C.) with stirring. Then, 10.306 grams (0.054 moles) of TCl was added all at once and stirred for 5 minutes and then 3.435 grams (0.017 moles) of ICl was added and stirred for 60 minutes. The solution got more and more viscose with time, and the solution temperature rose to 55° C., and further increase was controlled by slowing down the stirrer. The resultant polymer concentration in the solution was 6% (w/w) and the CaCl$_2$/amine molar ratio was 1.500. To determine inherent viscosity, a small portion of the solution was isolated in the water and washed several times and then dried in a 120° C. vacuum oven. The inherent viscosity measured in sulfuric acid (0.5 g/1 dl) was 3 dl/g.

133 grams of the DAPBI/MPD (50/50)-I/T (25/75) copolymer solution (8 grams of polymer) was added to a reaction kettle equipped with disc stirrer and nitrogen inlet/outlet. 150 grams of the MPD-I solution (28.95 grams of polymer) was added and stirred for one hour at high speed. The % copolymer was 21.6% (w/w) in the blend. The solution temperature was controlled below 55° C. The mixture solution was placed in vacuum oven at room temperature overnight to remove bubbles generated during the mixing. The resultant solution separated into two phases—one clear top layer and an opaque bottom layer, meaning this solution could not be spun into fibers.

Comparison Example B

Preparation of Incompatible 22/78 Weight Percent Polymer Mixture of DAPBI/MPD (40/60)-T Copolymer and MPD-I Homopolymer 375.5 grams of DMAc and 9.750 g of CaCl$_2$ were added to a 1 liter reaction kettle equipped with a basket stirrer and a nitrogen inlet/outlet and then heated to 70° C. to completely dissolve the CaCl$_2$. 7.880 grams (0.035 moles) of DAPBI was added to the hot solution and stirred until the DAPBI was completely dissolved. To this solution, 5.699 grams (0.053 moles) of MPD was added and dissolved. The solution was cooled to room temperature (25° C.) with stirring. 17.177 grams (0.085 moles) of TCI was then added all at once and stirred for 60 minutes. The solution got more and more viscose with time, and the solution temperature rose to 55° C., and further increase was controlled by slowing down the stirrer. The resultant polymer concentration in the solution was 6% (w/w) and the CaCl$_2$/amine molar ratio was 1.000. To determine inherent viscosity, a small portion of the solution was isolated in the water and washed several times and dried in 120° C. vacuum oven. The inherent viscosity measured in sulfuric acid (0.5 g/1 dl) was 2.89 dl/g.

133 grams of the DAPBI/MPD (40/60)-T copolymer solution (8 grams of polymer) was added to a reaction kettle equipped with disc stirrer and nitrogen inlet/outlet. 150 grams of the MPD-I solution (28.95 grams of polymer) was added and stirred for one hour at high speed. The % copolymer was 21.6% (w/w) in the blend. The solution temperature was controlled below 55° C. The mixture solution was placed in vacuum oven at room temperature overnight to remove bubbles generated during the mixing. The resultant solution exhibited micro-phase separation. The solution looked opaque with a syrupy cottage-cheese appearance. This solution could not be spun into fibers.

Example 7

Preparation of Fibers from 78/22 Weight Percent Polymer Mixture of DAPBI/MPD (80/20)-I/T (70/30) Copolymer and MPD-I Homopolymer The clear 78/22 polymer mixture of DAPBI/MPD (80/20)-I/T (70/30) Copolymer and MPD-I Homopolymer of Example 4 was charged into the metal syringe very carefully to prevent entrapment of air bubbles. The syringe filled was placed onto the syringe wet-spinning unit and the room-temperature polymer mixture was pumped out of the syringe through a 136-hole spinneret having 2.5 mil diameter capillaries. Once the system was completely filled with the solution and full flow established from the spinneret, the spinneret was immersed beneath the surface of a water coagulation bath maintained at room temperature. The wet-spun extruded filaments passed through the coagulation bath at 5 yards per minute and were wound up on a perforated metal bobbin. Filament linear density was approximately 2 to 3 denier per filament. The resulting bobbin was then placed in de-ionized water to extract the solvent, and the water was changed several times to insure good removal of the solvent. The filaments were dried in a hot tube at 250° C. and collected on a bobbin.

Example 8

Preparation of Fibers from 20/80 Weight Percent Polymer Mixture of DAPBI-I/T (60/40) Copolymer and MPD-I Homopolymer Dried filaments on a bobbin were made as in Example 7 using the 20/80 Polymer Mixture of DAPBI-I/T (60/40) Copolymer and the MPD-I homopolymer of Example 5.

Example 9

Preparation of Fibers from 50/50 Weight Percent Polymer Mixture of DAPBI-I/T (60/40) Copolymer and MPD-I Homopolymer Dried filaments on a bobbin were made as in Example 7 using the 50/50 Polymer Mixture of DAPBI-I/T (60/40) Copolymer and MPD-I homopolymer of Example 6.

Example 10

Dyeability of Filaments Made from Polymer Mixture

Samples of fiber from the bobbins of filaments made in Examples 8, 9, and 10 were tested for dyeability per the Dyeing Procedure test method and physical properties. All fiber samples were found to be dyeable with acidic dyes and have fiber tenacities in the ranges of from 2-4 grams per denier, depending upon the polymer composition.

Example 11

Effect of Acid and Basic Dyes

To further examine the effect of dye type, the fiber spinning process of Example 7 was used to spin a first control fiber utilizing 100% of the DAPBI-T/I (40/60) Copolymer of Example 3. A second control fiber was also made using the fiber spinning process of Example 7, utilizing 100% of the MPD-I homopolymer of Example 1.

In addition, following the procedures of Example 5 and 6, a 35%/65% polymer mixture of the DAPBI-T/I (40/60) Copolymer of Example 3 and the MPD-I homopolymer of Example 1 was made, and fiber was spun from that Polymer mixture using the process of Example 7.

These three fibers, along with the fiber from the 50/50 polymer mixture of DAPBI-I/T (60/40) copolymer and MPD-I homopolymer of Examples 9 were then dyed with acidic and basic dyes per the Dyeing Procedure test method. Both the acidic and basic dyes were red dyes.

Results are shown for the various compositions in the Table. The two control fibers showed the natural characteristic of the 100% polymer. Fiber of 100% DAPBI-I/T readily accepts acidic dye and was dyed a red color. Basic dyes did not dye the fiber red. Fiber of 100% MPD-I was only slightly dyeable with red basic dyes, illustrating the general challenge with dyeing the homopolymer. The MPD-I fiber was even less dyeable with acidic dyes, being very slightly tinted. Fibers made from the mixture of these polymers demonstrate surprising dyeability—the DAPBI-I/T dyeability—due to the unexpected position of the DAPBI-I/T polymer on the outer surface of the fiber.

TABLE

| DAPBI-I/T wt % | MPD-I wt % | Color After Acidic Dyeing | Color After Basic Dyeing |
|---|---|---|---|
| 100 | 0 | Dark Red | Yellow |
| 50 | 50 | Dark Red | Beige |
| 35 | 65 | Dark Red | Beige |
| 0 | 100 | Tinted | Dark Pink |

Comparison Example C

Fiber from Polyacrylonitrile Homopolymer/MPD-I Blend Solution

Using reaction equipment as in the prior examples, 20 grams of polyacrylonitrile homopolymer was dissolved in 80 grams of DMAc at room temperature by stirring with basket stirrer under nitrogen at room temperature in the reaction kettle. The polymer was completely dissolved in the solvent, making a transparent/clear solution.

296 grams of the 19.3% MPD-I solution in DMAc/CaCl2 from Example 1 was added to the polyacrylonitrile homopolymer solution prepared above and mixed for one hour in high shear. The blend solution was placed in 50° C. vacuum oven overnight to degas it. This solution was used for wet-spinning using the same procedure described in Example 7. The fiber was washed and dried the same way as Example 7.

The resulting fiber was placed in dyeing machine and dyed with basic dyes using the same Dyeing Procedure test method. As a control, 100% MPD-I fiber was also dyed with basic dyes using the same Dyeing Procedure test method. The fiber made from the blend of polyacrylonitrile homopolymer/MPD-I was colored or dyed as well as 100% MPD-I fiber. This indicates sheath/core separation of the polymer components in the polyacrylonitrile homopolymer/MPD-I blend did not occur, because polyacrylonitrile homopolymer by itself is not dyeable with basic dyes. If a sheath/core fiber had been formed with polyacrylonitrile homopolymer in the sheath, it should not have been dyeable. Subsequent testing showed that like DAPBI-I/T copolymers, the coagulation rate of acrylonitrile homopolymer in room temperature water is slower than the coagulation rate of MPD-I; however, the polyacrylonitrile homopolymer/MPD-I polymer blend does not provide the desired a similar fiber.

What is claimed:

1. A fiber comprising a mixture of at least a first polymer and a second polymer;
   the first polymer having a structure derived from the reaction of one or more amine monomers and a plurality of acid monomers, wherein
   i) the one or more amine monomers being 100 mole percent 5(6)-amino-2-(p-aminophenyl) benzimidazole, or the combination of metaphenylene diamine and at least 60 mole percent 5(6)-amino-2-(p-aminophenyl)benzimidazole, based on the total amount of amine monomers; and
   ii) the plurality of acid monomers include those having a structure of

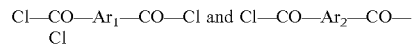

wherein $Ar_1$ is an aromatic group having para-oriented linkages and $Ar_2$ is an aromatic group having meta-oriented linkages, and wherein the plurality of acid monomers has at least 50 mole percent of the monomer containing aromatic group $Ar_2$; and
   the second polymer has a structure derived from the reaction of metaphenylene diamine and isophthaloyl chloride,
   wherein the fiber has a first-polymer-rich sheath, a second-polymer-rich core, and a transition zone having a combination of the first and second polymers,
   the transition zone further having a higher weight percentage of the second polymer nearer the core and a higher weight percentage of the first polymer nearer the sheath, forming a gradient between the second-polymer-rich core and the first-polymer-rich sheath.

2. The fiber of claim 1, wherein the mixture of first polymer and second polymer contains 25 to 80 weight percent of the first polymer, based on the total amount of first polymer and second polymer.

3. The fiber of claim 2, wherein the mixture of first polymer and second polymer contains 25 to 50 weight percent of the first polymer, based on the total amount of first polymer and second polymer.

4. A multifilament yarn comprising the fiber of any one of claims 1, 2 or 3.

5. A yarn comprising a staple fiber of any one of claims 1, 2 or 3.

6. A fabric comprising the fiber of any one of claims 1, 2 or 3.

7. A protective garment comprising the fiber of any one of claims 1, 2 or 3.

8. A method of producing a fiber comprising:
   a) mixing or blending at least a first polymer and a second polymer;
   the first polymer having a structure derived from the reaction of one or more amine monomers and a plurality of acid monomers, wherein
   i) the one or more amine monomers being 100 mole percent 5(6)-amino-2-(p-aminophenyl) benzimidazole, or the combination of metaphenylene diamine and at least 60 mole percent 5(6)-amino-2-(p-aminophenyl)benzimidazole, based on the total amount of amine monomers; and
   ii) the plurality of acid monomers include those having a structure of

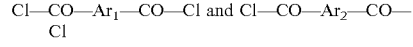

wherein $Ar_1$ is an aromatic group having para-oriented linkages and $Ar_2$ is an aromatic group having meta-oriented linkages, and
   wherein the plurality of acid monomers has at least 50 mole percent of the monomer containing aromatic group $Ar_2$; and
   the second polymer has a structure derived from the reaction of metaphenylene diamine and isophthaloyl chloride;

b) providing a homogeneous solution of the at least first polymer and a second polymer the suitable for spinning fibers; and c) spinning fibers from the solution, wherein the fiber has a first-polymer-rich sheath, a second-polymer-rich core, and a transition zone having a combination of the first and second polymers, the transition zone further having a higher weight percentage of the second polymer nearer the core and a higher weight percentage of the first polymer nearer the sheath, forming a gradient between the second-polymer-rich core and the first-polymer-rich sheath.

9. The method of producing a fiber of claim 8, wherein the mixture of first polymer and second polymer contains 25 to 80 weight percent of the first polymer, based on the total amount of first polymer and second polymer.

10. The method of producing a fiber of claim 9, wherein the mixture of first polymer and second polymer contains 25 to 50 weight percent of the first polymer, based on the total amount of first polymer and second polymer.

* * * * *